July 7, 1936.  W. HEMINGWAY, JR., ET AL  2,046,379
TRANSMISSION LOCK FOR AUTOMOBILES
Filed June 4, 1934  4 Sheets-Sheet 1

INVENTORS
Wilson Hemingway, Jr.
John Whyte.
BY
Alston F. Moulton
ATTORNEY

WITNESS
F. J. Hartman.

July 7, 1936.  W. HEMINGWAY, JR., ET AL  2,046,379
TRANSMISSION LOCK FOR AUTOMOBILES
Filed June 4, 1934  4 Sheets-Sheet 2

INVENTORS
Wilson Hemingway, Jr.
John Whyte.
BY
ATTORNEY

WITNESS

July 7, 1936.   W. HEMINGWAY, JR., ET AL   2,046,379
TRANSMISSION LOCK FOR AUTOMOBILES
Filed June 4, 1934   4 Sheets-Sheet 3

WITNESS
F. J. Hartman.

INVENTORS
Wilson Hemingway, Jr.
John Whyte.
BY
Alston B. Moulton
ATTORNEY

July 7, 1936.  W. HEMINGWAY, JR., ET AL  2,046,379

TRANSMISSION LOCK FOR AUTOMOBILES

Filed June 4, 1934  4 Sheets-Sheet 4

Patented July 7, 1936

2,046,379

UNITED STATES PATENT OFFICE 2,046,379

TRANSMISSION LOCK FOR AUTOMOBILES

Wilson Hemingway, Jr., Philadelphia, Pa., and John Whyte, Chicago, Ill., assignors to Electrolock Manufacturing Company, Vicksburg, Miss., a corporation of Mississippi Application June 4, 1934, Serial No. 728,936

18 Claims. (Cl. 70—128)

The present invention relates to transmission locks for automobiles, and more particularly to locks which prevent the gear-shifting or transmission lever from being moved when locked, to any position wherein the car may be propelled by the motor forwardly and so driven away.

An object of the present invention is to provide the transmission or gear-shifting lever with an exterior transmission lever locking sleeve, movable axially of the said lever from an unlocked position to a locked position and vice versa, said sleeve, when in its locked position, being operative to hold the said lever substantially rigid and unmovable with respect to the housing in which said lever is fulcrumed.

A further object of this invention is to provide a locking member for the transmission lever of an automobile which may be operated to lock the said lever in its "neutral" position or in its "reverse" position and which cannot be operated to lock the said lever in the "low gear" position, nor in the "intermediate gear" position or in the "high gear" position, thus making it necessary to throw the transmission lever either to the "neutral" or to the "reverse" position before the transmission lever can be locked rigid with respect to its casing.

A further object of this invention is to provide a key controlled locking mechanism which, when the transmission lever is locked thereby with the said lever in its "neutral" or its "reverse" position, cannot be moved therefrom without first unlocking the locking mechanism by the use of a key.

A further object of this invention is to provide a transmission lever locking mechanism which is operative to lock the transmission lever either in "neutral" or "reverse" position and when so locked, permits the movement of the transmission lever from "neutral" position to "reverse" position and from "reverse" position to "neutral" position, but is also operative to prevent the movement of the said lever into any position in which the car may be propelled forwardly by the motor.

A further object of this invention is to provide a transmission lever with a locking mechanism therefor which may be used as a replacement unit for cars provided with any of the standard gear shifts, to install which, it is merely necessary to remove the cap of the housing in which the standard transmission lever is mounted, remove the transmission lever therefrom, and to replace it with a new transmission lever provided with the locking mechanism disclosed herein.

A further object of this invention is to provide a construction wherein the locking of the transmission lever concomitantly effects the breaking of the ignition system of the automobile and holds the said circuit open so long as the said lever is locked, and which automatically closes the ignition circuit immediately the lever is unlocked, and so long as the said lever is unlocked, insofar as this automatic circuit-breaker is concerned, it being recognized that if the circuit be broken at some other place than at the switch controlled by the transmission lever lock, this circuit breaker cannot alone break or complete the ignition circuit if broken elsewhere.

Other objects of this invention will appear in the specification and claims below.

In the drawings forming a part of this specification and wherein the same reference characters are used throughout the various views to designate the same parts.

In the drawings there are shown only those parts of the gear transmission casing and the shifting members mounted therein as are necessary for an understanding of the present invention. The transmission casing 1 may be of any suitable design and the cover or closure 2 may be of standard construction. In the cover are mounted two gear shifting elements 3 and 4 respectively secured to shafts 5 and 6 which shafts are longitudinally slidable in bearings 7 in lugs or ribs 8—9 projecting from the interior surface of the cover 2. The gear shifting elements 3—4 are respectively provided with opposed recesses 10—11 on sides adjacent each other for the reception of the lower end or toe 12 of the transmission lever 13 which is manipulated in the usual way in the shifting of the gears of an automobile.

The gear shifting elements 3 and 4 are respectively provided with depending yokes 14 and 15 which fit into grooves of the hubs of the usual slidable gears (not shown) of the transmission mechanism. Midway between the shafts 5 and 6, is a rigid bar 16 having end flanges 17—17 respectively rigidly secured to the adjacent sides of the lugs or ribs 8—9, the upper edge of said bar 16 being provided with a notch 18 into which the lower end or toe 12 of the transmission lever 13 smoothly fits when the lever is in "neutral" position and which is operative to prevent any forward or rearward movement of the transmission lever 13 until said toe has been moved laterally clear of said notch and into one or the other of the recesses 10 or 11 of the gear shifting elements 3 and 4.

This bar 16 is not of itself novel and may be replaced with any other standard construction by means of which the lower end of the transmission lever is constrained to move in a substantially H-shaped path in the gear changing operations and the "neutral" position is at the middle of the horizontal line of the letter H.

The cover 2 is preferably provided with an integral housing or casing 19 which preferably tapers upwardly and terminates in an externally threaded head 20 providing a shoulder 21. A cap 22 is threaded over said head. The head 20 is provided with an axial passge 23—24—25 therethrough, the upper end 23 being cylindrical and of substantially larger diameter than the cylindrical opening 25 at the lower end thereof. Between these cylindrical sections is an intermediate section 24, the surface of which is spherically concave to form the seat or fulcrum for the transmission lever 13. The cap 22 has a relatively large axial opening 26 therethrough and into its upper part is fitted a keeper member 27, the under inner surface 28 of which is spherically concave and concentric with the center of the said spherical surface 24 forming the fulcrum of the transmission lever. Extending through the keeper member is an opening 29 of irregular shape for the free passage therethrough of the transmission lever 13 and which will be described more fully below.

Figures 6, 7, 8, 17, 18:
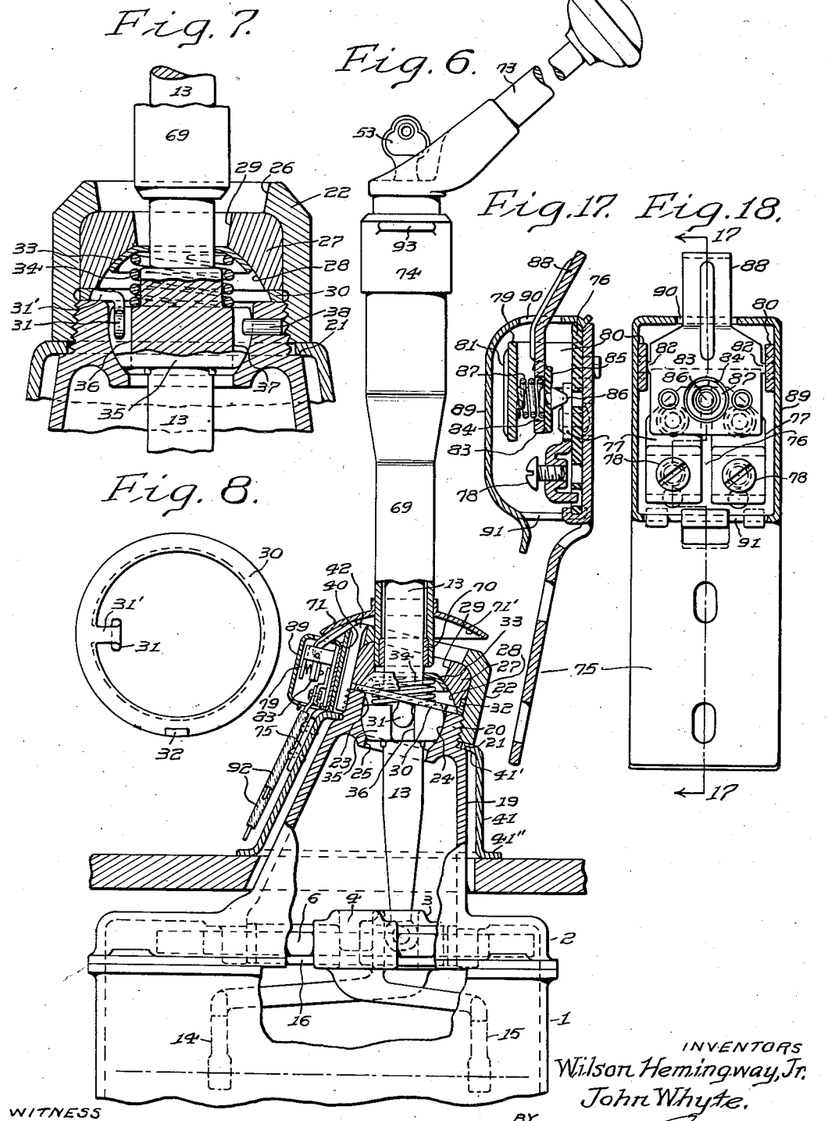
Fig. 6 is a view similar to Fig. 1 but with the lever locked in "reverse" position.
Fig. 7 is a vertical sectional view on the line 7—7 of Fig. 1, but on an enlarged scale.
Fig. 8 is a plan view of the ring member shown in Fig. 7.
Fig. 17 is a vertically central sectional view on the line 17—17 of Figure 18, of an automatic circuit breaker for the ignition circuit, operative to automatically break and make the ignition circuit of the automobile when the tranmission lever is respectively locked and unlocked, the scale being larger than in Figs. 1, 2 and 6.
Fig. 18 is a front elevational view of the structure shown in Fig. 17 but with the cap cross-sectioned to better show the structure of the mechanism.

Clamped between the lower circular edge of the keeper member 27 and the upper end of the head 20 is a ring-shaped member 30, shown on an enlarged scale in Figs. 7 and 8, and provided with a depending neck 31' terminating in a disk-like head 31 extending downwardly from the inner edge thereof, and with a lug 32 extending upwardly from the inner edge of said ring. The head 31, neck 31' and lug 32 may be and preferably are integral with the ring 30 and are respectively bent downwardly and upwardly from the plane of the ring. They are preferably positioned on the ring 90° from each other. The inner wall of the opening through the ring may and preferably is tapered divergingly downwardly to insure ample clearance for the movement of the dish-shaped washer 33 slidingly fitting around the transmission lever. The washer 33 is provided with a spherically convex upper surface which is held against the surface 28 of the keeper 27 by a compressed coiled spring 34, the ends of which are respectively seated on the inner surface of the washer 33 and the ball 35 of the transmission lever which in turn is thus held seated in the spherical surface or fulcrum 24.

The ball 35 is preferably provided with vertical channels 36 and 37 on diametrically opposite sides thereof, into one 36, of which is fitted the disk-like head 31 and into the other 37, of which is fitted a cylindrical pin 38 of substantially the width of the slot 37. The axes of the head 31 and of the cylindrical pin 38 are in alinement with each other and with the center of the spherical surface of the ball 35 (see Fig. 7). The lower narrow edge of the keeper member 27 is provided with a notch 39 into which fits the lug 32 of the ring 30.

The cap 22 is also provided with a cylindrical hole 40 therethrough so positioned that when the cap is properly seated on the head 20 with the flange 41' of the skirt 41 clamped between the edge of the cap and the seat or shoulder 21 and with the ring-shaped member 30 clamped between the top of the head 20 and the keeper member 27, a hardened steel pin 42, square in cross-section, may be tightly driven into said hole 40 with a flat side thereof lying against the outer cylindrical surface of the keeper member 27. When the sharp lower end of the said pin 40 reaches the screwthreads on the head 20, it cuts a keyway for the pin in and through the screwthreads, thereby making it impossible to remove the cap or to turn it except by drilling out the hardened steel pin 42, which is, in fact, a difficult operation, requiring considerable time.

The housing 19 is of ordinary cast iron construction and by drilling a hole therethrough, a thief may insert a rod or tool through the opening so made and push the gear-shifting element (3 or 4) which is not locked, into high or intermediate speed position. If the transmission lever be locked in "neutral" he may start the motor and drive the car away even though the transmission lever be locked. The skirt 41 is to protect against such mischievous practices. The skirt is of hard steel, its upper flange 41' is tightly clamped between the housing 22 and the cap and the latter is substantially irremovable. Its lower flange lies flat on the floor of the car.

The upper end of the transmission lever 13 is preferably provided with a cylindrical section 43 terminating in a section 44, square or polygonal in cross-section, over which is fitted a generally cylindrical member 45 having a longitudinal bore therethrough, the lower end 46 of said bore being cylindrical and fitting the cylindrical section 43 of the transmission lever and having a squared or polygonal opening 47 fitting the polygonal end 44 of the transmission lever.

Above the polygonal opening 47 is a cylindrical counterbore for the reception of the head of a screw 48 and a washer 49 by which the member 45 is immovably secured to the upper end of the transmission lever 13. The counterbore leads into a larger cylindrical chamber 50 for the reception of a lock cylinder 51 which, generally speaking, may be of any suitable construction so long as it provides an inner cylinder 52 adapted to be turned by the key 53 and the inner cylinder is provided with an eccentric pin 54 for the retraction of a transverse locking plunger 55, preferably squared or rectangular in cross-section, seated in a slot milled across the bottom of the outer cylindrical casing 52, and into which the pin 54 extends. The said slot is closed by a plate 56 operative to retain the bolt or plunger 55 within the said slot.

The bolt or plunger 55 is provided with a notch or recess 57 providing a shoulder or abutment against which the eccentric pin 54 presses to retract the bolt into the cylinder against the outward pressure of a relatively light spring 58 when the key is inserted and the inner cylinder 52 is rotated for the purpose of unlocking the transmission lever.

The lower end of the generally cylindrical member 45 is provided with one or more longitudinal grooves 59 and over said grooved lower end is fitted a slidable member 60 which is slitted longitudinally to form key strips 61 which fit into the grooves 59. This construction permits the member 60 to slide longitudinally of the member 45 but prevents any rotational movement of the members with respect to each other. The bottom 60' of the member 60 is provided with a hole for the free passage therethrough of the transmission lever 13 and extending between said bottom 60' and a shoulder 62 on said lever 13 is a coiled compression spring 63 to normally hold said member 60, and the parts rigid therewith, in their uppermost positions with the upper end of the member 60 held firmly against a shoulder 64 on the outer surface of the member 45. A pin 65 in the outer cylinder 51 of the lock projects into a cooperating slot 66 in the inner cylinder 52 to retain the said inner cylinder within the outer cylinder or casing, and to permit of a limited rotation of the inner cylinder. A set screw 67 mounted in the upper end of the member 45 and projecting into an appropriate opening 68 of the outer casing 56 fixedly retains the lock cylinder within the upper end of the generally cylindrical member 45.

Fitting tightly over the slidable member 60 and rigidly secured thereto as by spot-welding, is the upper end of the transmission lever locking sleeve 69 which, extending downwardly, over the transmission lever 13 is provided at its lower end with a ring 70 within the sleeve 69 and rigid therewith and slidingly fitting the outer surface of the transmission lever 13. Fitted over the lower end of the tube or sleeve 69 is rigidly secured a circular member having a substantially concave spherical under surface 71' to which reference will again be made below.

The upper end of the generally cylindrical member 45 is provided with a socket 72 which may be angularly disposed rearwardly and upwardly and in which is rigidly secured the upper reach or extension 73 of the transmission rod 63, terminating in the usual knob or handle.

To the upper end of the transmission lever locking sleeve 69 is secured a cap 74 with an opening in the top thereof for the passage therethrough of the upper cylindrical end of the member 45 and this cap is also rigidly secured to the said sleeve 69, as by spot welding.

Secured to the outer surface of the skirt 41 is a bracket 75 extending above the skirt and lying close to the outer surface of the cap 22 and on the upper end of this bracket is secured a sheet of insulating material 76 to which in turn is secured two metallic stationary contact members 77 having their inner edges parallel and spaced from each other, and provided at their lower ends respectively with the binding screws 78—78 by means of which they may be connected to the ignition circuit of the car.

Also secured to the bracket is a bridge member 79 secured to the upper end of the bracket 75 rigidly in any suitable manner, and providing two upright supports 80—80, the upper ends of which are rigidly connected together by the web 81 unitary therewith. Pivotally mounted on trunnions 82—82 fitting into alined holes in the uprights 80—80 respectively is a movable contact plate 83 having an ample hole 84 therethrough, closed at its inner end by a strip 85 of insulating material secured thereto and having the movable contact metallic point 86 riveted thereto. The riveted end of the movable point 86 is substantially at the center of the hole 84 and well clear of the plate 83. The movable contact point 86 is tapered and is in registration with the space between the stationary contact plates 77—77. A compression spring 87 is also seated in the hole 84 and surrounds the said riveted end of the movable contact point 86, but does not make contact therewith. One end of said compression spring 87 presses against said insulating strip 85 and the other end presses against the web 81 and surrounds a lug in the web 81. This spring 87 normally holds the contact point 86 in the slot between the plates 77—77 and in contact therewith to close the circuit through said point 86. From the upper edge of the movable contact plate 83 extends an operating lever 88, inclined upwardly over the upper edge of the cap 22 and under the circular member 72 secured to the lower end of the transmission rod locking sleeve 69.

This circuit breaker may be provided with a suitable cover 89 rigidly secured to the bracket 75 in any suitable manner and providing an opening 90 for the passage therethrough of the lever 88 and a passage 91 therethrough of the leads 92—92 of the ignition circuit.

Figures 1, 2, 3, 4, 5:
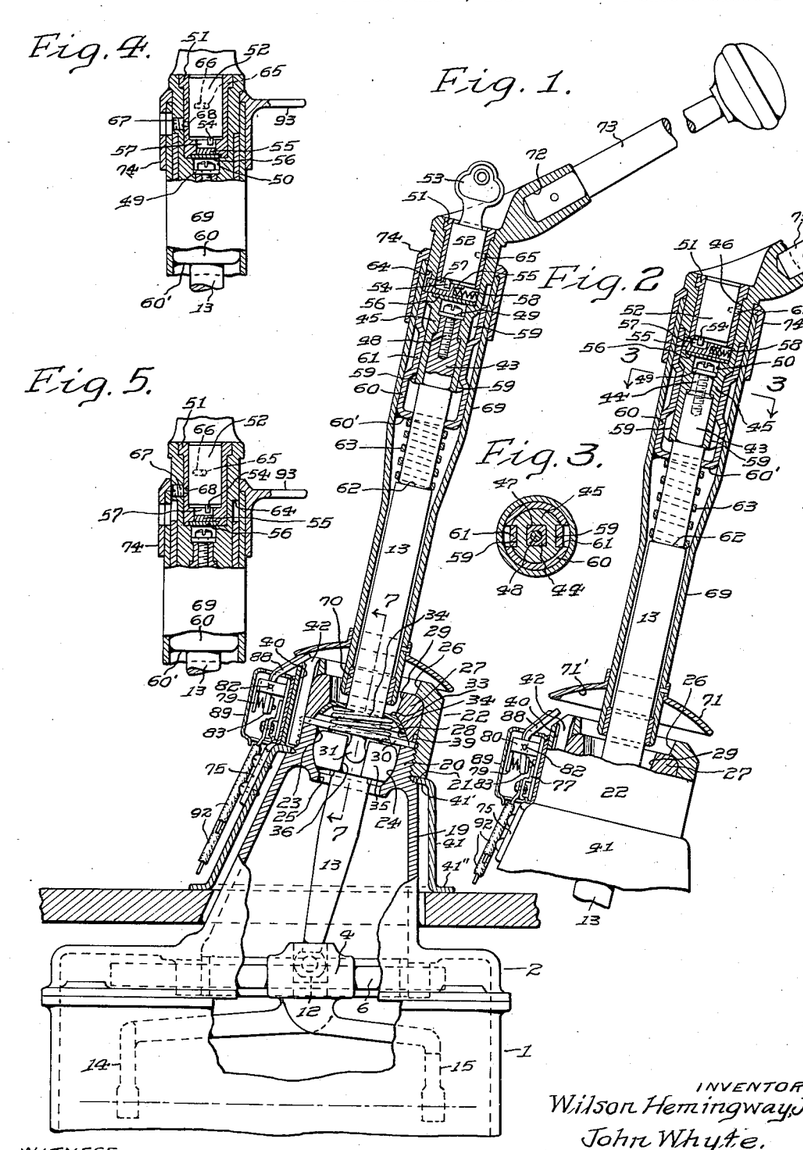
Fig. 1 is in general a vertical longitudinal sectional view of a transmission lever locking-mechanism embodying our invention, the said lever being in "neutral" position and the lever locked.
Fig. 2 is a view similar to Fig. 1 with the lever still in its "neutral" position but with the mechanism unlocked.
Fig. 3 is a transverse cross-sectional view on the line 3—3 of Fig. 2.
Fig. 4 is a vertical sectional view of the key operated lock taken at right angles to the position shown in Fig. 1 and with the transmission lever sleeve in unlocked position.
Fig. 5 is a sectional view like Fig. 4 except that the said sleeve is in locked position.

From the foregoing description it will now be plain that the tension of the spring 63 pressing upwardly against the bottom 60' of the slidable member 60 normally holds said slidable member 60 and the sleeve 69, the cap 74, the circular member 71 and the ring 70, all unitary therewith, in their uppermost positions shown in Fig. 2 with the lower end of the locking tube or sleeve 69 above and clear of the opening 29 in the keeper member 27 so long as the bolt or plunger 55 is retained within the locked outer cylinder 51 by the slidable member 60. When, however, the transmission lever locking sleeve 69 is depressed to its lower position, as by manually pressing downwardly on the lip or plate 93 projecting outwardly laterally from the cap 74 or by pressing with the foot downwardly on the circular member 71, the plunger or bolt 55 will snap outwardly over the upper end of the slidable member 60 and the said parts, as a unit, will be locked in their lowermost position with the lower end of the transmission locking tube or sleeve 69 well within the opening 29 of the keeper member 27. In coming to this position the under surface 71' of the circular member 71 will have engaged and depressed the lever 88 to move the movable metal compact point 86 clear of the plates 77 to break the ignition circuit. The parts so locked together in their lowermost position is plainly shown in Fig. 1 and in this position they will remain locked by the bolt 55 so long as and until the key 53 is inserted within the inner cylinder 52 and is turned to withdraw said bolt 55 inwardly from over the edge of the sliding member. When, however, the key 53 is so turned and the bolt 55 is retracted, the compression spring 63 will immediately lift the said members to their uppermost position, shown in Fig. 2, and the compression spring 87 of the circuit breaker will operate to move the contact point 86 back into engagement with the plates 77 to close the circuit.

When the said locking sleeve 69 and its cap 74 are in the upper position shown in Fig. 4, the opening 74' therethrough give access to the set screw 67 which retains the cylinder 51 in the member 45, but when the said sleeve and its cap are in their lower locked position, the hole 74' is out of alinement with the screw 67 and the latter is covered by the sleeve. This insures against the removal of the locking cylinder 51 so long as the locking sleeve 69 is in its lower locked position.

In Figs. 9 to 13 are shown the keeper member or plate 27, the opening 29 therethrough and the path through which the axis of the transmission lever moves in the operation of shifting the gears of a standard five-position transmission, to wit, neutral, reverse and three forward drive positions. Thus in Fig. 10, the lever 13 is in "neutral" position 94 and is unlocked. The opening 29 is of a size and shape to permit the lever to be readily moved from the said "neutral" position to the four driving positions diagrammatically shown in Fig. 11. Thus the axis of the lever 13 may be moved from "neutral" position 94, through the "intermediate" position 95, to "low gear" position 96. As the speed of the car increases, the lever may thereafter be moved from the "low gear" position 96, back through positions 95 and 94, and through the second intermediate position 97 into the "second gear" position 98 and thence rearwardly through "intermediate" position 97 to "high gear" position 99. Or, on the other hand, the transmission lever may be moved from the "neutral" position, through "intermediate" position 95 into "reverse" position 100. Thus from "neutral" position 94 the lever must be first moved laterally in the straight line path between the intermediate positions 95 and 97.

Figure 9:
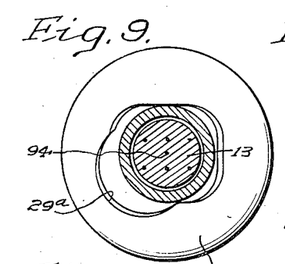
Fig. 9 shows the keeper member with the transmission lever locked therein at "neutral".
Figure 10:
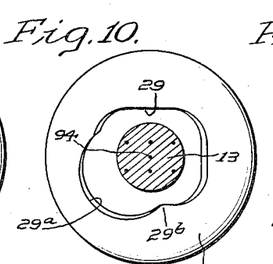
Fig. 10 is a view similar to Fig. 9 except that the transmission lever is not locked, and is free to be thrown to any of its gear changing positions.
Figure 11:
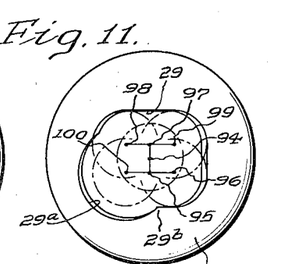
Fig. 11 is a top plan view of the keeper member showing in dot-and-dash lines the five major positions of the transmission lever of a standard transmission, the full path of the axis of the said lever being diagrammatically shown.
Figure 15:
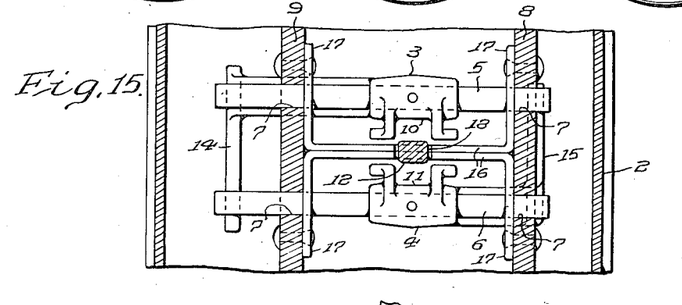
Fig. 15 is a fragmentary plan view of the gear-shifting members which are actuated by the forward and rearward movement of the transmission lever, and the notched bar employed for preventing such movement when the lever is in the "neutral" position.
Figure 16:
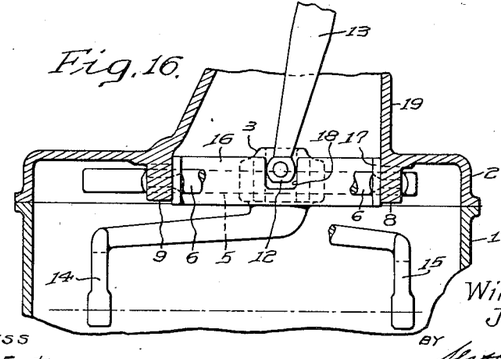
Fig. 16 is a side elevational view of the mechanism shown in Fig. 15 with the greater portion of the left hand gear-shifting member and its support broken away to show the said notch by which the transmission lever is prevented from motion forwardly or rearwardly as long as the said lever is in "neutral" position.

When, however, the lever 13 is in "neutral" position, the transmission lever locking sleeve or tube 69 may be depressed into the opening 29, as shown in Fig. 9, the said transmission lever 13 is locked and cannot be moved into any other position. It cannot be moved laterally to the intermediate positions 95 or 97 by reason of the engagement of the sleeve 69 with the opposite sides of the opening 29. It cannot be moved forwardly or rearwardly because in "neutral" position the toe 12 of the transmission lever 13 is in the notch 18 of the rigid bar as is clearly shown in Figs. 15 and 16.

Nor can said transmission lever be locked in the "low gear" position 96 nor in the "second gear" position 98, nor in the "high gear" position 99 for in those positions the lever 13 is close to the wall of the opening 29, and the space between the lever 13 and the wall of the opening 29 is insufficient to permit of the insertion of the lower end of the sleeve 69 therein.

Figure 12:
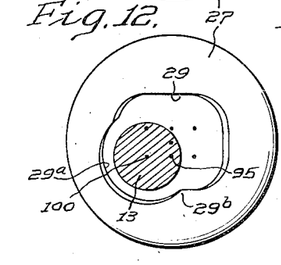
Fig. 12 is a similar view showing the transmission lever in "reverse" position, and unlocked.
Figure 13:
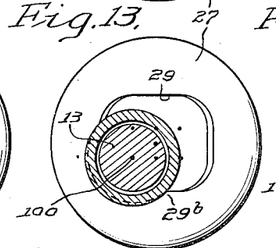
Fig. 13 is a view similar to Fig. 12 but with the transmission lever locked in "reverse" position.

In parking a car, it is usual to apply the brakes, lock the ignition and then either throw the transmission lever into either the "neutral" or into "reverse" position, and in the embodiment of this invention, shown in Figs. 9 to 13, the opening 29 is of a shape to provide for the locking of the transmission lever 13 in "reverse" position. The opening 29 is provided with a bay or recess 29a for the reception of the lower end of the locking sleeve 69 when the transmission lever 13 is in the "reverse" position. In Fig. 12 the transmission lever is shown in "reverse" position 100. In this position, the transmission locking sleeve 69, when depressed, will substantially fit against the walls of the bay 29a as shown in Fig. 13. From this position the lever 13 cannot be moved until the key 53 has been operated to release the transmission lever locking sleeve from its depressed position. It will be plain that from the position 100 the transmission lever must first be moved rearwardly to the position 95. Such motion is prevented, however, by the engagement of the sleeve or tube 69 with the portion 29b of the wall of the opening 29. The lever 13 cannot be drawn straight back rearwardly until the sleeve 69 has been unlocked and raised clear of the opening 29.

Thus this invention provides a lock for the transmission lever which holds said lever rigid and immovable with respect to its housing, in either the "neutral" or in the "reverse" position, but from which locked position it cannot be moved until the locking sleeve 69 can rise, after the locking cylinder 52 has been operated by a key to retract the bolt 55.

Figure 14:
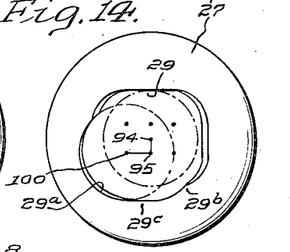
Fig. 14 illustrates a modified form of sleeve keeper opening which permits the transmission lever, when locked, to be shifted from the "reverse gear" position to the "neutral" position or from the "neutral" position to the "reverse gear" position, but which is operative to prevent the shifting of the transmission lever, when locked, into "low" or into "intermediate" or into "high-gear" driving positions.

In Fig. 14 is shown a modification wherein the lever 13 may be locked when in either "neutral" or in "reverse" position and when so locked may be moved from "neutral" to "reverse" position or, conversely, from "reverse" to "neutral" position, without raising the transmission rod locking sleeve 69 out of the keeper opening 29. This is accomplished by providing the opening 29 with a plane surface 29ᶜ parallel to the path 100-95 of the transmission lever 13 and by locating the abutment portion 29ᵇ to the rear of the position shown in Figures 9 to 13 sufficient to permit the said lever 13 to move to the intermediate position 95 when the locking sleeve or tube 69 is locked in its depressed position in the opening 29. This permits one to move the transmission lever 13 when the locking sleeve 69 is locked in depressed position to move from the "neutral" position 94 through "intermediate" position 95 to "reverse" position 100, and from said "reverse" position back to "neutral" position, but the abutment portion 29ᵇ prevents the movement of the lever from the intermediate position 95 into the "low gear" position 96.

In both these embodiments of this invention, when the transmission lever has once been locked by depressing the locking sleeve 69 into the opening 29, one is unable, without unlocking the locking cylinder 52, to move the transmission lever into any of the positions in which the car may be propelled by the motor forwardly.

It is almost impossible to push a car, even rearwardly, when the gears are in "reverse". In the case of an emergency, it is of advantage to be able to shift the transmission lever from "reverse" into "neutral" in order to move the car forwardly or rearwardly as may be necessary, even though the car cannot be driven forwardly under its own power, and the modification shown in Figure 14 permits this to be done.

The purpose of the ring 30 with its downturned disk-like head 31 and its upturned lug 32, will now be apparent. The keeper member 27 must be accurately positioned on the head 20 to cooperate with the transmission lever 13 and the locking sleeve 69 in the manner above described.

In assembling the device, after the ball 35 has been properly placed upon the seat or fulcrum 24 with the cylindrical pin 38 fitted into its slot 37 in the ball 35, the ring-like member 30 is placed on the top of the head 20 with the disk-like head 31 and the neck 31' in the vertical slot 36 in the ball 35 with the lug 32 rising from the outer periphery of the ring 30. Then the keeper member 27, provided with the accurately positioned notch 39, is placed upon the ring 30 with the lug 32 in the notch 39. The cap 22 may now be screwed tightly down over the head 30 but the ring 30 cannot turn axially with respect to the head 20 or with respect to the axis of the rod 13 because of the engagement of the disk-like head 32 with the side walls of its slot 36; the rod 13 cannot rotate on its axis because of the engagement of the pin 38 in its slot 37; and the keeper member 27 cannot be turned frictionally with the cap 22 or for any other reason because of the engagement of the lug 32 with the notch 39. In this way the keeper member 27 is positioned and maintained at all times in correct relationship with the lever 13, and the opening 29 will be maintained in virtual registration with the path which the lever 13 is constrained to follow in shifting the gears of the transmission.

Since the ring-shaped member 30 is fixed in its relationship to the head and since the transmission lever 13, when unlocked, must be moved from the intermediate positions, 95 and 97 forwardly and rearwardly through a substantial angle with respect thereto in operating the transmission, the neck 31' is provided between the head 31 and the ring 30 to afford a clearance sufficient to permit of the corresponding movement of the side walls of the slot with respect to such head, as is clearly shown in Fig. 1.

The cap 103 should be marked to be turned to a predetermined position wherein the opening 104 would be in proper registration with the path through which that portion of the lever 13, passing therethrough, travels in moving to the various gear shifting positions.

Figure 19:
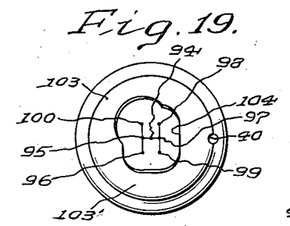
Fig. 19 is a plan view and Fig. 20 is a vertical sectional view of a modified construction of the cap.
Figure 20:
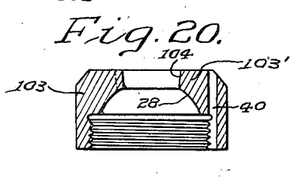
Figure 21:
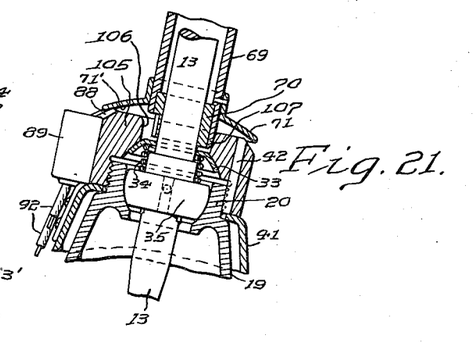
Fig. 21 shows, in vertical cross-section, a further modification of the invention.

In Figs. 19 and 20, the keeper member and the cap are shown combined as a unit construction. The keeper opening 104 in the cap 103 may be of the same shape as that shown in Figs. 9 to 14 inclusive. If the head 103' of the cap 103 is the same distance from the center of the ball 35 that the keeper member 28 of the previous modifications was, and is provided with a spherical surface 28' like the under surface 28 of the keeper member 27, this cap 103 could be substituted for the cap 22 in the previously described constructions, with the ring-shaped member 30 omitted. The position which the cap 22 must be turned to register the keeper opening 104 with the locking sleeve 69 in the "neutral" and "reverse" positions should be marked on the cap and housing in any suitable manner.

In all the constructions previously described herein, the end of the transmission lever locking sleeve 69 is cylindrical and the opening in the keeper member is of an irregular shape, but the lower end of the said locking sleeve 69 may be made of appropriate irregular shape to cooperate with a substantially cylindrical opening in the cap and Figs. 21 to 29 show such modifications of the invention. The transmission lever 13 and its fulcrum in the head 20 of the housing, the cup-shaped member 33 and the compression spring 34 are the same as previously described.

Figure 22:
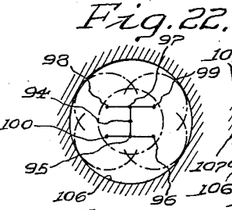
Figs. 22 to 25 are, in general, diagrammatic views showing the path in which the transmission lever shown in Fig. 21 may move when locked and unlocked, in a three forward speed transmission.

The cap 105 is like the cap 103 previously described, except that the opening 106 is substantially cylindrical, and when the lever is in "neutral" position, its axis is coincident with the axis of the transmission lever. The diameter of the opening 106 is such that when the transmission lever 13 is not locked it may be freely moved in the H-shaped path to any of its five main positions, as shown in Fig. 22. In the previously described positions 96, 98, 99 and 100, the transmission lever 13 will lie close to the wall of the opening 106 with which the cap 105 is provided, as is indicated in Fig. 22.

Figures 23, 24:
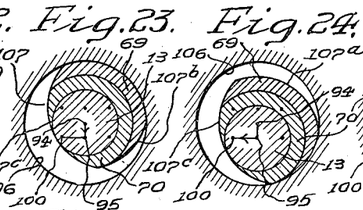

The lower end 107 of the transmission locking sleeve or tube 69 is shaped to provide three cylindrical surfaces, the radii of which are substantially the same as the radius of the circular opening 106, it being understood that the necessary clearances should be provided in actual construction. Thus the axis of the cylindrical surface 107ª substantially coincides with the axis of the cylindrical hole or opening 106 when the transmission lever 13 is in the "neutral" position 94 as shown in Fig. 23. The axis of the surface 107ᵇ is coincident with the axis of the hole or opening 106 when the transmission lever 13 is in the "first intermediate" position 95 shown in Figure 24 and the axis of the cylindrical section 107ᶜ is coincident with the axis of the opening 106 when the transmission lever 13 is in the "reverse" position 100 in Fig. 25.

These surfaces may be readily turned in a lathe or milled through the sleeve 69 and into the sleeve 70 rigidly secured to the lower end of the locking sleeve 69.

Figure 25:
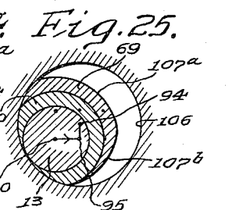

It follows, therefore, that the lower end 107 of the sleeve 69 may be inserted into and locked in circular opening 106 when the lever 13 is in its "neutral" position, as shown in Fig. 23 or when it is in its "reverse" position as shown in Fig. 25, and that the transmission lever with the end 107 in the opening 106 may be moved from the "neutral" position 94 to the first intermediate position 95 and thence pushed forwardly in the reverse position 100 and conversely, from position 100, through position 95 to position 94. In other words, the transmission lever 13 may be moved exactly as has been described in connection with the movement shown in Fig. 14.

But it may not be moved from the "neutral" position 94 into the "second intermediate" position 97 by reason of the engagement of the surface 107ª with the wall of the opening 106 and when the transmission lever is in the first intermediate position 95, it cannot be moved therefrom back into the "low gear" position 96 by reason of the engagement of the surface 107ᵇ with the wall of the opening 106 as shown in Fig. 24. Nor can the end 107 of the sleeve be depressed into the opening 106 in any forward driving position 96, 98 or 99 of the transmission lever for in such positions some portion or part of the lower end of the sleeve 69 will not be in alinement with the hole or opening 106 but will engage the top of the cap and prevent the sleeve 69 from being depressed to its lowermost position.

The form of the invention shown in Figs. 21 to 25 is well adapted for use in a transmission having four forward speeds. In this type of transmission there is a "third intermediate" position 101 and a very low slow speed "starting" position 102 plainly shown in Fig. 26. The other three forward gear positions correspond to the positions 96, 98 and 99 previously described.

Figure 26:
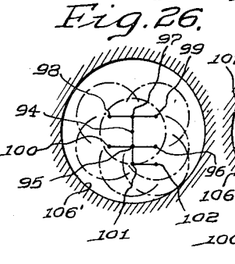
Figs. 26 to 29 are also diagrammatic views showing the construction of Fig. 21 applied to a transmission having four forward speeds.
Figures 27, 28, 29:
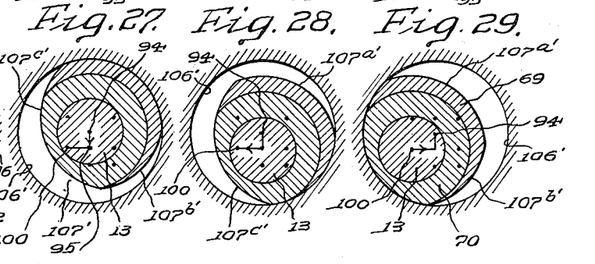

In this modification, then, the substantially cylindrical opening 106' through the cap 105', is a little larger, to permit the transmission lever 13 to be moved from the "neutral" position 94 through the first "intermediate" position 95 and on to the third intermediate position 101 and thence to be drawn back to the low speed position 102. The lower end 107' of the lever 69' is correspondingly larger than the lower end 107 of the previously described modification. In Figure 26 the six essential positions of the transmission lever 13 are indicated and when the said transmission lever is in the "very low" gear position 102, its outer surface is close to the wall of the circular opening 106' as is clearly shown in Fig. 26. The lower end 107' in this construction is provided with three substantially cylindrical surfaces, to wit, the surface 107ª' substantially coincident with the wall of the opening 106' when the lever 13 is in the "neutral" position shown in Fig. 27; the substantial cylindrical surface 107ᵇ' the center of which is coincident with the center of the opening 106' when the transmission lever 13 is in the "first intermediate" position 95, and the substantially cylindrical surface 107ᶜ' the axis of which is coincident with the axis of the opening 106' when the transmission lever 13 is in the "reverse" position 100. When the lower end 107' of the transmission lever locking sleeve 69 is within the opening 106', the lever 13 may be freely moved back and forth by and between the reverse position 100 and the "neutral" position 94 through the "first intermediate" position 95 but in no other direction. The surface 107ª' prevents any movement of the lever toward the second intermediate position 97 and, therefore, prevents the lever from being moved into either of the driving positions 98 or 99 and the surface 107ᵇ' prevents the transmission lever 13 from being moved from the first intermediate position 95 into the forwardly driving position 96, or from being moved toward the third intermediate position 101 and consequently prevents the lever from being thrown into any forwardly driving position of the transmission.

The locking sleeve can only be moved downwardly into the opening 106' when the axis of the transmission lever is in the path 94—95—100.

In any other position the lower end 107' of the sleeve 69' will contact with the upper surface of the cap as above explained, to prevent the entry of the sleeve 69' into the opening 106'. The three cylindrical surfaces of the lower end of the locking sleeve 106 may be conveniently formed in a lathe or milling machine by mounting the sleeve therein in a position eccentric to the axis of the sleeve and cutting away that portion of the sleeve which extends into the path of the cutter on a curve, the radius of which is the same as the radius of the opening in which the sleeve is to be inserted.

The advantages of making the lower end of the lever 69 with the three cylindrical surfaces above described and of providing the cap with a substantially cylindrical opening are that the surfaces are easily formed on the lower end of the sleeve and the cap does not have to be turned to any definite position.

It is to be observed that in all the various forms and embodiments of our invention herein shown and described, there are present a gear shifting lever and a mounting in which said lever is fulcrumed to normally move into "neutral" and into "reverse" positions, and into at least three forwardly driving positions (in the arrangement shown in Figs. 21, 26 to 29, there are four forwardly driving positions); that the lever locking device comprises two parts, namely, the locking member and the keeper member having a keeper opening through which the transmission lever per se freely passes and in which it is freely movable to all normal gear shifting positions when the locking member is unlocked; that the lever locking device comprises two main elements, a movable element and a stationary element, one of which is provided with an opening and the other of which comprises a member adapted for relative movement into and out of the opening and more specifically into and out of the space between the walls of the opening and the transmission lever proper; and that one of said elements is mounted on said lever and that the other is mounted on said housing; that when the movable member is locked, it is in locking engagement with respect to the lever, that is to say, it prevents the movement of the lever into certain of its normal operating positions; that in unlocked positions, the movable member is in alinement with the space between the lever and the walls of the opening and may be inserted therein when the lever is in two positions, to wit, "neutral" position and "reverse" position and is out of alinement with said space and is non-insertable into said space when unlocked and the lever is in any of the three (or four, as in Figs. 21, 26 to 29) forwardly driving positions; that when unlocked, one of said locking elements projects into the path of the movement of the other element and prevents the movable element from being moved into its locked position when and so long as the transmission lever is in any forwardly driving position; that when the locking member element is in its locked position and the lever is in its "neutral" position, the locking member substantially abuts against the wall of said opening in the direction in which the lever is movable from "neutral" position into any forwardly driving position and thus prevents the shifting of the gearing into any forwardly driving position; and that in the modification shown in Figs. 1 to 18, 14 to 16, and in the modifications shown in Figs. 21 to 25 and in the modification shown in Figs. 21, 26 to 29, the wall of the opening is spaced from the locking member when locked in the direction in which the lever is movable in shifting from "neutral" to "reverse" position and from "reverse" position to "neutral", thereby enabling the operator of the car to throw the shifting lever into "reverse" position from "neutral" position when the car is parked on a hill or incline, or from "reverse" to "neutral" when it is desired to push the car from one position to another, all without unlocking the transmission.

Having thus described our invention, what we claim and desire to protect by Letters Patent of the United States is:

1. In a transmission lever lock, the combination of a transmission lever having a ball, a housing having a head providing with said ball a fulcrum mounting for said lever, means to limit the movement of said lever to a transverse path and to forward and rearward extending paths leading from and disposed at substantially right angles to said transverse path, means to retain said ball in said socket and including a keeper-member, a cap rotatable with respect to said lever and enclosing said keeper-member, and means to position and prevent the rotation of said keeper member with respect to said lever.

2. The combination with a transmission lever lock, of a transmission lever locking sleeve slidable thereon longitudinally of said lever, yielding means normally tending to hold said sleeve in its uppermost position, means to lock said sleeve rigid and immovable with respect to said lever when said sleeve is in its lower position, a rigid housing member in which said lever is fulcrumed, means rigid with said housing member providing a keeper-opening for the lower end of said sleeve when said sleeve is in its lower position and said lever is in its "reverse" position, and providing an obstruction to the entry of said sleeve into said keeper opening when said lever is in any forward driving position.

3. The combination with a transmission lever, of a transmission lever locking sleeve slidable thereon longitudinally of said lever, yielding means normally tending to hold said sleeve in its uppermost position, means to lock said sleeve rigid and immovable with respect to said lever when said sleeve is in its lower position, a rigid housing in which said lever is fulcrumed and means rigid with respect to said housing providing a keeper-opening for the reception of the lower end of said sleeve when said sleeve is in its lower position and when said lever is in its "reverse" position and when said lever is in its "neutral" position, and to preclude the entry of said sleeve into said opening when said lever is in any forward driving position.

4. The combination with a transmission lever, of a transmission lever locking sleeve slidable thereon longitudinally of said lever, yielding means normally tending to hold said sleeve in its uppermost position, means to lock said sleeve rigid and immovable with respect to said lever when said sleeve is in its lower position, a rigid housing in which said lever is fulcrumed and means rigid with said housing providing a keeper-opening for the reception of the lower end of said sleeve when said sleeve is in its lower position and said lever is in its "reverse" position and when said lever is in its "neutral" position and operative to prevent said lever from being moved into any forwardly driving position so long as said sleeve is in its said lower position.

5. In a transmission lever lock, the combination of a housing providing a socket, a transmission lever provided with a ball fitting said socket, means to limit the movement of said lever to a lateral path and to forward and rearward paths, parallel to each other, and leading from said lateral path and at right angles thereto, a keeper-member, means to position and maintain said keeper-member in correct and proper relationship with respect to said housing and lever, and comprising a ring-like member provided with means to prevent the axial rotation of said ring with respect to said lever and with means to prevent the axial rotation of said ring with respect to said keeper-member, and means to retain said ball in said socket including a cap enclosing said keeper-member and operative to firmly clamp said keeper-member and said ring-like member between said cap and said housing.

6. In a transmission lever lock, the combination of a transmission lever having a ball member with a slot in the surface thereof in the plane of the axis of said lever, a housing providing a socket for the reception of said ball member, means to limit the movement of said lever to a transverse "neutral" path and to forward and rearward gear changing paths, leading from said "neutral" path, a ring-like member seated on said housing having a head fitting said slot in said ball, a keeper-member seated on said ring-like member, means to properly position said keeper-member on said ring, and to prevent axial movement of said keeper-member with respect to said ring, and means to retain said ball in said socket, including a cap axially rotatable with respect to said lever and enclosing said keeper-member and having a screwthreaded connection with said housing.

7. In a transmission lever lock, the combination of a transmission lever having a ball member with a slot in the surface thereof in the plane of the axis of said lever, a housing providing a socket for the reception of said ball member, means to limit the movement of said lever to a transverse "neutral" path and to forward and rearward gear changing paths, leading from said "neutral" path, a ring-like member seated on said housing having a head fitting said slot in said ball, a keeper-member seated on said ring-like member, means to properly position said keeper-member on said ring, and to prevent axial movement of said keeper-member with respect to said ring, and means to retain said ball in said socket, including a cap axially rotatable with respect to said lever and enclosing said keeper-member and having a screwthreaded connection with said housing and operative to clamp said keeper-member and said ring-like member between said cap and said housing.

8. In a transmission lever lock, the combination with a transmission lever member and a housing member in which said lever is fulcrumed, of a locking element cooperating with said lever and movable into locked and into unlocked positions, one of said members having means presenting an obstruction to the movement of said locking element to locked position when and so long as said lever is in any forward driving position; presenting an obstruction to the movement of said lever to any forward driving position when and so long as said locking element is in locked position, and presenting no obstruction to the free movement of said locking element into and out of locked position when said lever is in "reverse" operating position.

9. In a transmission lever lock, the combination with a transmission lever member and a housing member in which said lever is fulcrumed, of a locking element coacting with said lever and movable into locked and unlocked positions, one of said members having means presenting an obstruction to the movement of said locking element to locked position when and so long as said lever is in any forward driving position; presenting an obstruction to the movement of said lever to any forward driving position when and so long as said element is in locked position, and presenting no obstruction to the free movement of said locking element into and out of locked position when said lever is in "reverse" position and when said lever is in "neutral" position.

10. In a transmission lever lock, the combination with a transmission lever member and a housing member in which said lever is fulcrumed, of a locking element coacting with said lever and movable into locked and unlocked positions, one of said members having means presenting an obstruction to the movement of said locking element to locked position when and so long as said lever is in any forward driving position; presenting an obstruction to the movement of said lever to any forward driving position when and so long as said element is in locked position, and to present no obstruction to the free movement of said element into and out of locked position when said lever is in "reverse" operating position and when said lever is in "neutral" position and presenting no obstruction to the free movement of said lever into and between "reverse" and "neutral" positions when and so long as said element is in locked position.

11. The combination with a transmission lever, of a transmission lever locking member mounted on said lever, a housing providing a fulcrum for said lever, means to prevent the axial rotation of said lever with respect to said housing, a keeper member having a keeper opening surrounding said lever, means to properly position said keeper opening with respect to said lever and housing to prevent the rotary movement of said keeper with respect to said lever, and a cap surrounding said lever and forming a closure for said housing and cooperating with said keeper member to maintain said lever mounted on said fulcrum.

12. In a transmission lever lock, the combination with two members comprising a transmission lever and a housing in which said lever is fulcrumed, of a locking element mounted on one of said members and relatively movable into and out of an opening in the other of said members when said lever is in certain of its normal operating positions, one of said members extending across the path of the movement of said locking element, when unlocked, and preventing the insertion of said locking element into said opening when said lever is in any forwardly driving position, said locking element being in alinement with and relatively insertable into the space between said transmission lever member and the wall of said opening when said lever member is in "neutral" position and when it is in "reverse" position.

13. In a transmission lever lock, the combination with two members comprising a transmission lever and a housing on which the lever is mounted and into which it projects, of a locking element mounted on one of said members and movable into and out of an opening in the other of said members when said lever is in certain of its normal operating positions; said other member extending across the path of the movement of the locking element, when unlocked, and preventing the insertion of said locking element into said opening when said lever is in any forwardly driving position, said locking element being in alinement with and insertable into the space between said transmission lever member and the wall of said opening when said lever member is in "neutral" position and when said lever is in "reverse" position, said locking element when locked, abutting against the wall of said opening in the direction in which said lever member is movable in shifting from "neutral" position into any forwardly driving position, and spaced from the wall of said opening in those directions in which said lever member is movable in shifting into and between "neutral" position and "reverse" position.

14. The combination with a transmission lever locking element and a housing providing a fulcrum for said lever, of a member associated with said housing and forming a receptacle for said element when said element is in locked position, the wall of said receptacle being in the path of said locking element when locked and blocking the movement of said lever in the direction in which said lever is movable in shifting from "neutral" position to any forwardly driving position and spaced from and out of the path of said locking element in the directions in which said lever is movable in shifting to, from and between "neutral" and "reverse" positions, when said element is locked.

15. In a transmission lever lock, the combination with a transmission lever and a housing in which said lever is fulcrumed, of a locking element and a keeper element providing an opening therein surrounding said lever, one of said elements being mounted on said lever and the other of said elements being mounted on said housing, one of said elements being movable into locked and unlocked positions and the other of said elements being stationary with respect to the other element, the opening in said keeper element being in substantial alinement with said movable element when said lever is in its "neutral" and is in its "reverse" positions to permit of the relative movement of said movable element into and out of locked position within said opening, the wall of said opening being in substantial abutment against said movable element, when locked, in the direction in which said lever is movable in shifting from "neutral" to any forward driving position.

16. In a transmission lever lock, the combination with a transmission lever and a housing in which said lever is fulcrumed, of a locking element and a keeper element providing an opening therein surrounding said lever, one of said elements being mounted on said lever and the other of said elements being mounted on said housing, one of said elements being movable into locked and unlocked positions and the other of said elements being stationary with respect to the other element, the opening in said keeper element being in substantial alinement with said movable element when said lever is in its "neutral" and is in its "reverse" positions to permit of the relative movement of said movable element into and out of locked position within said opening, the wall of said opening being in substantial abutment against said movable element, when locked, in the direction in which said lever is movable in shifting from "neutral" to any forward driving position, and spaced from said movable element in the direction in which said lever is movable in shifting to, from and between "neutral" and "reverse" positions to present no obstruction to the free movement of said lever into, from and between "neutral" and "reverse" positions, when said movable element is locked.

17. In a transmission lever lock, the combination with two members comprising a transmission lever and a housing in which said lever is fulcrumed, of a movable locking element mounted on one of said members and a stationary rigid locking element mounted on the other of said members, one of said elements providing an opening surrounding said lever and the other of said elements being in alinement with and relatively insertable into the space between said lever and the wall of said opening when said lever is in "neutral" and is in "reverse" positions, and non-insertable into said space when said lever is in any forwardly driving position, said insertable member when inserted into said space substantially abutting against the wall of said opening in the direction in which said lever is movable in shifting from "neutral" to any forward driving position, said wall of said opening being spaced from said insertable element, when inserted, in the direction in which said lever is movable in shifting to, from and between "neutral" and "reverse" positions.

18. In a transmission lever lock, the combination with a transmission lever and a housing in which said lever is fulcrumed, a keeper stationary with respect to said housing and provided with an opening surrounding said lever, of a locking member mounted on said transmission lever and movable thereon to lock said lever against movement in certain of its normal operating positions, said locking lever, when unlocked, being in alinement with and movable into and out of the space between said lever and the wall of said keeper opening when said lever is in "neutral" and when it is in "reverse" positions, said locking member being out of alinement with and non-insertable into said opening when said lever is in any forward driving position.

WILSON HEMINGWAY, Jr.
JOHN WHYTE.